(12) United States Patent
Huang et al.

(10) Patent No.: US 11,244,172 B2
(45) Date of Patent: Feb. 8, 2022

(54) TIME VARIANT GEOGRAPHICAL INFORMATION SYSTEMDATA ACQUISITION DEVICE FOR MOBILE VEHICLES AND THE SYSTEM THEREOF

(71) Applicant: Mintron Energy Technology Co., Ltd., Taoyuan (TW)

(72) Inventors: Chen-Sheng Huang, Taoyuan (TW); Chia-Ming Chuang, Taoyuan (TW)

(73) Assignee: Mintron Energy Technology Co., Ltd., Taoyuan (TW)

( * ) Notice: Subject to any disclaimer, the term of this patent is extended or adjusted under 35 U.S.C. 154(b) by 0 days.

(21) Appl. No.: 16/956,778

(22) PCT Filed: Nov. 14, 2019

(86) PCT No.: PCT/CN2019/118352
§ 371 (c)(1),
(2) Date: Jun. 22, 2020

(87) PCT Pub. No.: WO2020/103754
PCT Pub. Date: May 28, 2020

(65) Prior Publication Data
US 2020/0320313 A1  Oct. 8, 2020

(30) Foreign Application Priority Data

Nov. 23, 2018 (CN) .......................... 201811404443.1

(51) Int. Cl.
*G06K 9/00* (2006.01)
*G08G 1/04* (2006.01)
(Continued)

(52) U.S. Cl.
CPC ..... *G06K 9/00785* (2013.01); *G06K 9/00671* (2013.01); *G08G 1/04* (2013.01);
(Continued)

(58) Field of Classification Search
None
See application file for complete search history.

(56) References Cited

U.S. PATENT DOCUMENTS 9,805,601 B1 * 10/2017 Fields .................... G06Q 40/08
2007/0005609 A1 * 1/2007 Breed .................. B60N 2/2863
(Continued)

FOREIGN PATENT DOCUMENTS

| CN | 105291984 A | | 2/2016 | |
|---|---|---|---|---|
| CN | 108230715 | * | 6/2018 | ....... G08G 1/096783 |
| CN | 108230715 A | | 6/2018 | |

*Primary Examiner* — Gelek W Topgyal
(74) *Attorney, Agent, or Firm* — Wang Law Firm, Inc.

(57) ABSTRACT

An time variant geographical information acquisition system for mobile vehicles and the system thereof is disclosed, which provides the time variant geographic information system to at least one mobile vehicle located in the aforementioned three-dimensional space, wherein the system comprises: a plurality of image capturing apparatus, at least one monitoring host and at least one time variant geographical information acquisition system for mobile vehicles installed on the above-said mobile vehicle, in which the data capture device includes: a wireless communication unit, connected to the image capturing apparatus and/or the monitoring host; a timing unit, used to output a timing signal in cooperation with the wireless communication unit; a memory module, storing the geographic information corresponding to at least the aforementioned mobile vehicle in the three-dimensional space; and a traffic scenario output interface, collectively displaying the geographic information and the time variant object information.

11 Claims, 11 Drawing Sheets

(51) Int. Cl.
*G08G 1/0967* (2006.01)
*H04N 7/18* (2006.01)

(52) U.S. Cl.
CPC . *G08G 1/096783* (2013.01); *G08G 1/096791* (2013.01); *H04N 7/181* (2013.01)

(56) References Cited

U.S. PATENT DOCUMENTS

2015/0222378 A1* 8/2015 Stahlin ................. G08G 1/0112 370/324
2019/0220678 A1* 7/2019 Guo ..................... G06K 9/6218

* cited by examiner

TIME VARIANT GEOGRAPHICAL INFORMATION SYSTEMDATA ACQUISITION DEVICE FOR MOBILE VEHICLES AND THE SYSTEM THEREOF

FIELD OF THE INVENTION

The present invention generally relates to a geographical information data acquisition device and a system; in particular, it relates to a time variant geographical information acquisition system for mobile vehicles and the serve as a time variant data set for an intelligent transport system.

BACKGROUND OF THE INVENTION

With the rapid population growth and significant increase in traffic flow, accidents inevitably continue to rise. In general, driver is the main cause of most accidents. Although some vehicles are equipped with various sensors to remind drivers of the surrounding conditions, development of traffic flow and road condition away from the driver can only be notified by wireless means, news or road condition notification shown on the electronic bulletin board. Meanwhile, technology advancement has made autonomous driving possible. Automated vehicles (AV) acquire information around the vehicle via varies sensors, and in combination with static geographic information to form a real-time geographic information system or driving scenario for the AV computing system to drive the car. But AV, like human driver, is limited to what they can see, and are greatly compromised in bad weather conditions. Due to its small viewing angle toward the road, AV sensors typically have poor resolution in detecting road breaks, road potholes, broken bridge or damages, accumulated water and snow. AV sensors are blocked by curved or uphill roadway or vehicles located in front leading to poor decision making and may lead to accidents.

Figure 1:
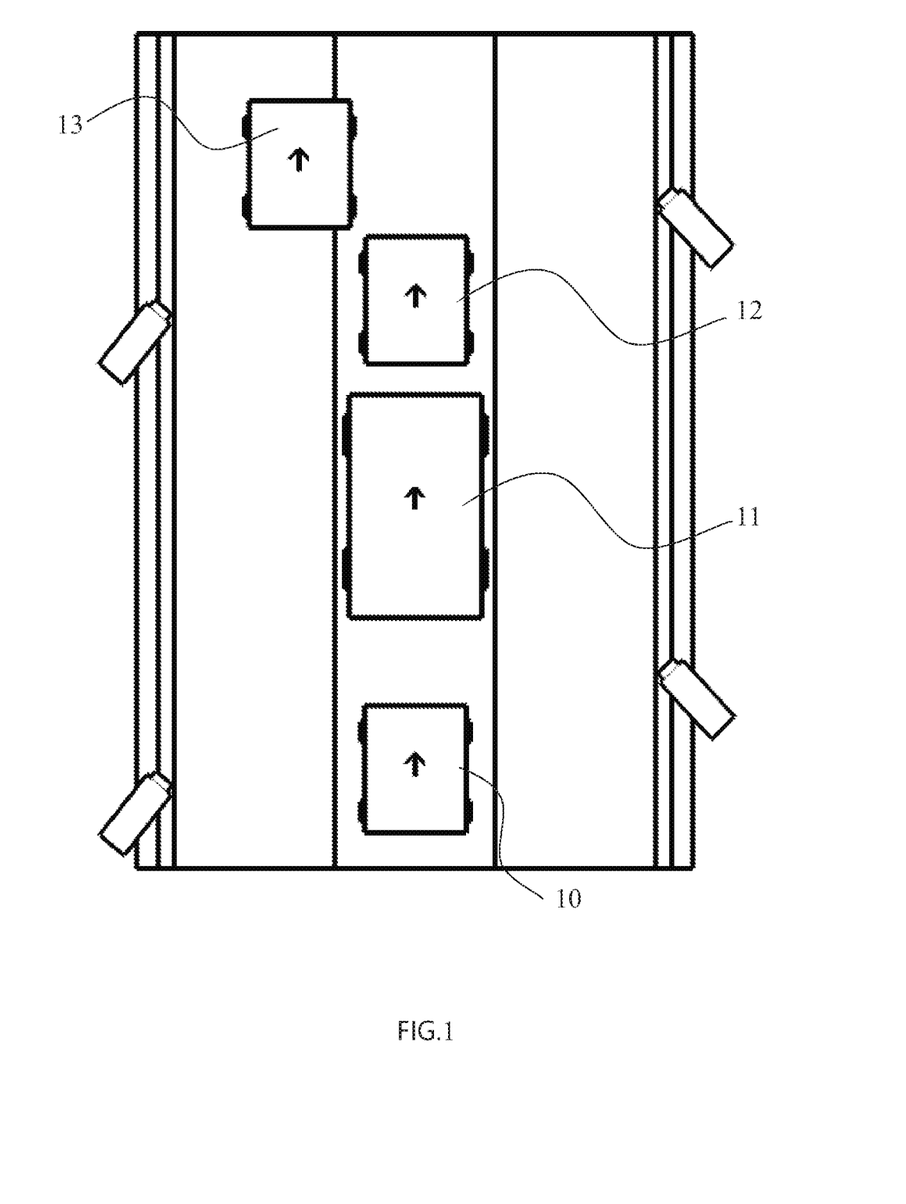
FIG. 1 shows a typical driving scenario with a large vehicle blocking the view of the vehicles in front

As shown in FIG. 1, from the perspective of vehicle 10, vehicle 12 and vehicle 13 are occluded by vehicle 11 ahead, so that if vehicle 12 or 13 created conditions that require immediate attention, the driver of vehicle 10, or its equivalent AV sensors, occluded by vehicle 11, cannot make the appropriate moves immediately. Only when vehicle 11 took evasive action, or the occlusion removed, would vehicle 10 had a chance to act, and by then it could be too late. Therefore, how to make the geographical information data acquisition device output available to all drivers, including AVs, has become an urgent problem to be solved.

Prior art intelligent transport system (ITS) uses a set of cameras to monitor the traffic scenario across an intersection, another set of cameras and system hardware to detect speeding, and a different set of cameras and system for traffic light violations. Integration of different services under ITS is a very difficult task. Prior art parking lot operation requires physical gate and barrier, multiple cameras, and dedicated system for system management. It is highly desirable to use a minimal set of cameras that can provide a rich set of vehicle movement information that allows a remote monitoring host to process seamlessly into traffic flow control, traffic violation, and park management functions.

SUMMARY OF THE INVENTION

In view of the aforementioned deficiencies of the prior art, it is desirable to provide a time variant geographical information system of the present invention that can accomplish the following objectives: (1) monitor the position and predict movement of all objects (vehicles, pedestrian, flying debris, and other objects) within a predetermined range, and to provide real-time information, projected traffic scenario, or alarm information to all road users and authority; (2) operate in combination with the traffic signaling systems to proactively enhance safety level to prevent accidents, and to improve traffic system efficiency; (3) detect unsafe driving behavior and to alert other road users or to give real time warning or fines; (4) provide road conditions of the monitored area and the location and prediction dynamic status of all vehicles by means of mobile applications to improve pedestrian road safety; (5) provide entry and exit information of vehicles into a parking lot, and empty parking space information that allows for smart, gateless parking management.

In addition, the present invention also provides a time variant geographical information to all drivers, including AVs, via streaming video and other wireless means in order to improve driving safety.

As such, according to an embodiment, a time variant geographical information system of the present invention provides real time geographical information to at least one road user, the system comprises:

a plurality of image capturing apparatus, in which at least a part of them are installed at locations higher than the vehicle, with each of the image capturing apparatus aiming at different road segment, and the capability to output information with precise time stamp;

at least one monitoring host for receiving image data having the time stamp that including: a synchronization processor, a processing device and a database, wherein the synchronization processor that operates on at least part of the image data, and the database stores the geographic information of the fixed objects in at least part of the three-dimensional space, and the database also stores the time variant location information of moving objects;

at least one time variant geographical information acquisition system installed on a vehicle, wherein the data capture device includes: a wireless communication unit for connecting to the image capturing apparatus and/or the monitoring host; a timing unit used for operating conjunctively with the wireless communication unit to output a timing signal; a memory module storing the geographic information corresponding to at least the mobile objects in the three-dimensional space; and a traffic scenario output interface for jointly displaying the geographic information and the projected time variant object movement information;

wherein the processing device from the monitoring host, based on the time difference between the received signal from the timing unit and the time stamp mark, generates a new, time base corrected, predicted moving object location for the time variant geographical information system and transmit to the vehicle.

In comparison with conventional technologies, the time variant geographical information acquisition system according to the present invention can monitor fixed objects and road environment conditions within a predetermined area by means of the image capturing apparatus located higher than the mobile vehicles, then performing time base synchronization operation for object location determination and trajectory prediction by the monitoring host, so as to not only secure the real-time three-dimensional road conditions and to present the position and predicted trajectory of all moving objects. When consolidate multiple image capturing apparatus output and synchronize to a same base time, it can provide real time traffic scenario to an existing traffic signaling system to improve the overall performance. Out of the ordinary vehicle behavior are noted and alarm given to nearby vehicles. When consolidate multiple image capturing apparatus output and synchronize to a target vehicle time and position, it can provide a real time traffic scenario to the driver (or autonomous system) to improve the driving capability and safety. When tracking vehicle crossing an intersection with red light, traffic violation is identified. When tracking vehicle crossing into a parking lot entrance, parking transaction is activated. When tracking vehicle crossing into a highway bordering a cliff, vehicle accident is identified and emergency vehicle dispatched. In addition, present invention can collaborate with autonomous driving systems and serve as a redundant means of geographical information input above and beyond the ones from the on vehicle sensors, therefore increase the safety level of the autonomous driving system.

Time variant geographical information may also be accessed via a cellular phone based application for road users and pedestrians to be aware of their surroundings and to be alerted of dangerous development in order to promote safety.

Herein the remark numbers shown in the Figures: 10, 12, 13, 31, 33, 34, 35, 52, 53, 54, 72, 73 vehicles; 23, 231, 232, 515 image capturing apparatus; 27 time variant geographical information acquisition system; 601-609 Steps in the flowchart; 11, 32 larger vehicle; 21, 501, 511, 521 monitoring host; 25, 513 communication device; 29 mobile vehicle; 30 road; 36 lamp post; 211 processing device; 213 synchronization processor; 215 database; 271 wireless communication unit; 272 timing unit; 273 memory module; 274 traffic scenario output interface; 41 windshield; 42 indication route; 320, 330, 340, 350 virtual vehicle diagram; 50, 51 zone; 70 zone; 71 sign reminder; 74, 75 displays.

DETAILED DESCRIPTION OF THE ILLUSTRATED EMBODIMENTS

The present invention will be further described hereunder in conjunction with the attached drawings and specific embodiments. However, these examples are intended to be illustrative only and not to limit the scope of the invention. Persons skilled in the art can make various changes and/or modifications to the present invention, and such equivalent changes and/or modifications are also within the scope and claims of the present invention.

It should be noted that the mobile vehicles referred by the present invention may include, but not limited to, buses, cars, locomotives, bicycles, tricycles, unmanned aerial vehicles, mobile robots, autonomous vehicles, marine vessels or aircraft, and is not restricted to the purpose for human transportations or cargo usage.

It should be noted that roadway referred by the present invention may include, but not limited to highways, paved roadways, unpaved grounds, and marine navigable channels.

It should be noted that image capturing apparatus referred by the present invention may include, but not limited to cameras, infra-red cameras, 3-d lidars, 3-d radars, and line scan cameras. For convenience, the following embodiments are exemplified with cars and image capturing apparatus as cameras.

First Preferred Embodiment

Figure 2:
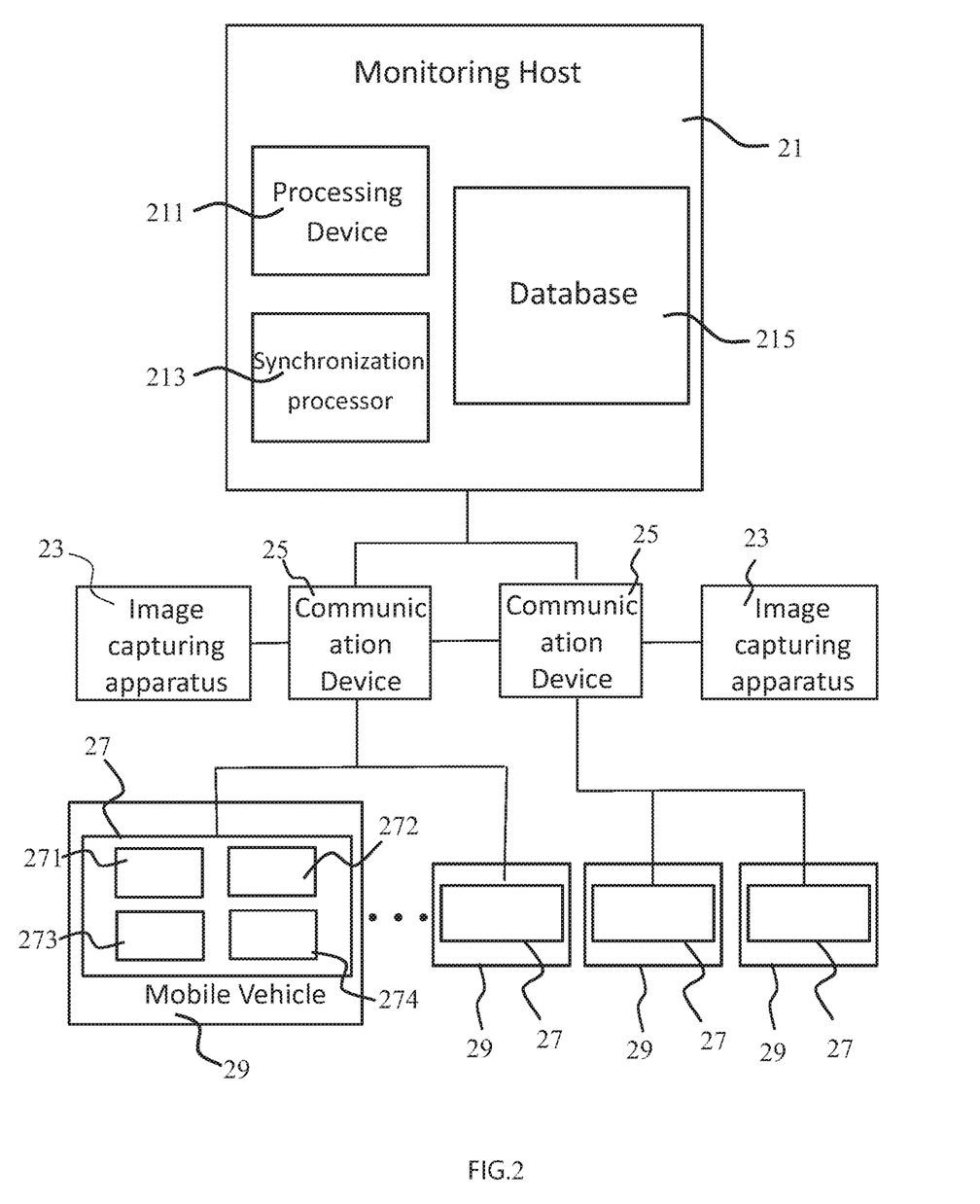
FIG. 2 shows a system diagram of a preferred embodiment for the time variant geographical information system according to the present invention.

FIG. 2 shows a system diagram of a first preferred embodiment for the time variant geographical information system according to the present invention, wherein the driving scenario is illustrated as the roadway and surrounding environment for vehicles. It can be observed that the time variant geographical information system in this embodiment comprises a monitoring host 21, an image capturing apparatus 23, a communication device 25 and a time variant geographical information acquisition system 27 (abbreviated hereunder as the data capture device) installed on the vehicle 29. The communication device 25 may use Dedicated Short Range Communication (DSRC), microwave, 4G C-V2X (Cellular Vehicle-to-Everything), or 5G or any other wireless communication protocol to connect with vehicles 29; the connection between the communication device 25 and the monitoring host 21 may use wireless or any wired network linkages, such as Ethernet or optic fiber.

Figure 3:
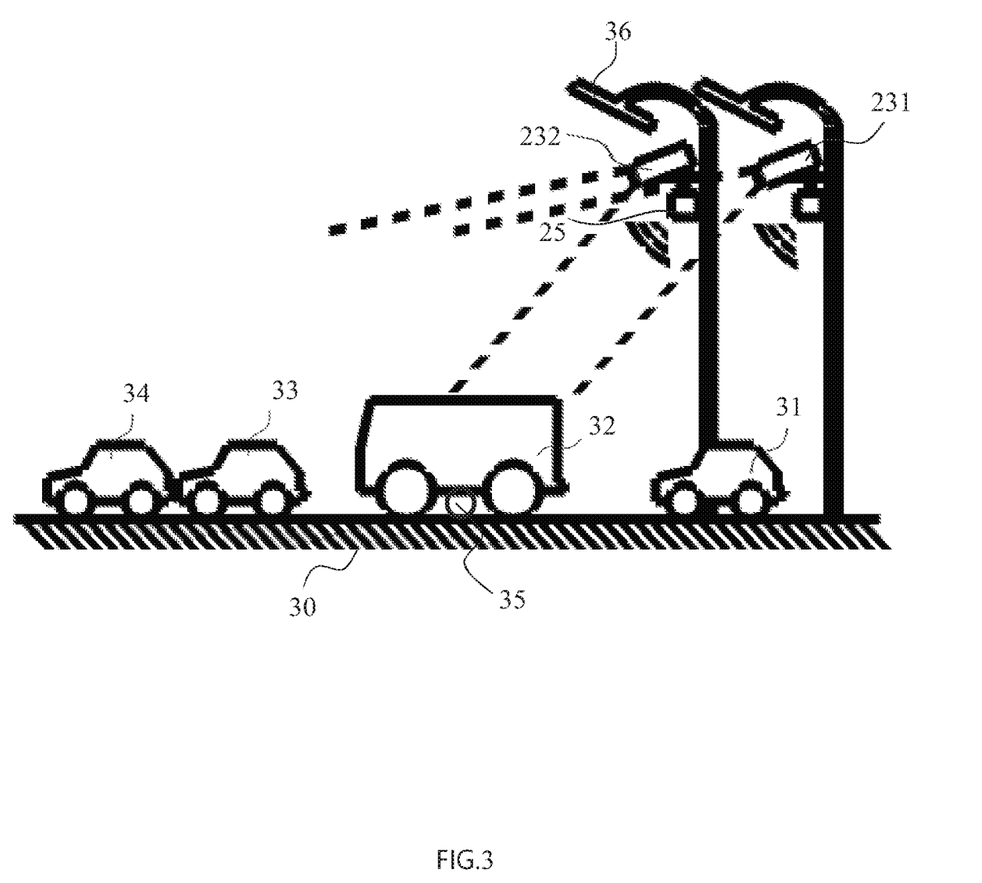
FIG. 3 shows a side view of the system configuration of the preferred embodiment according to the present invention.
Figure 4:
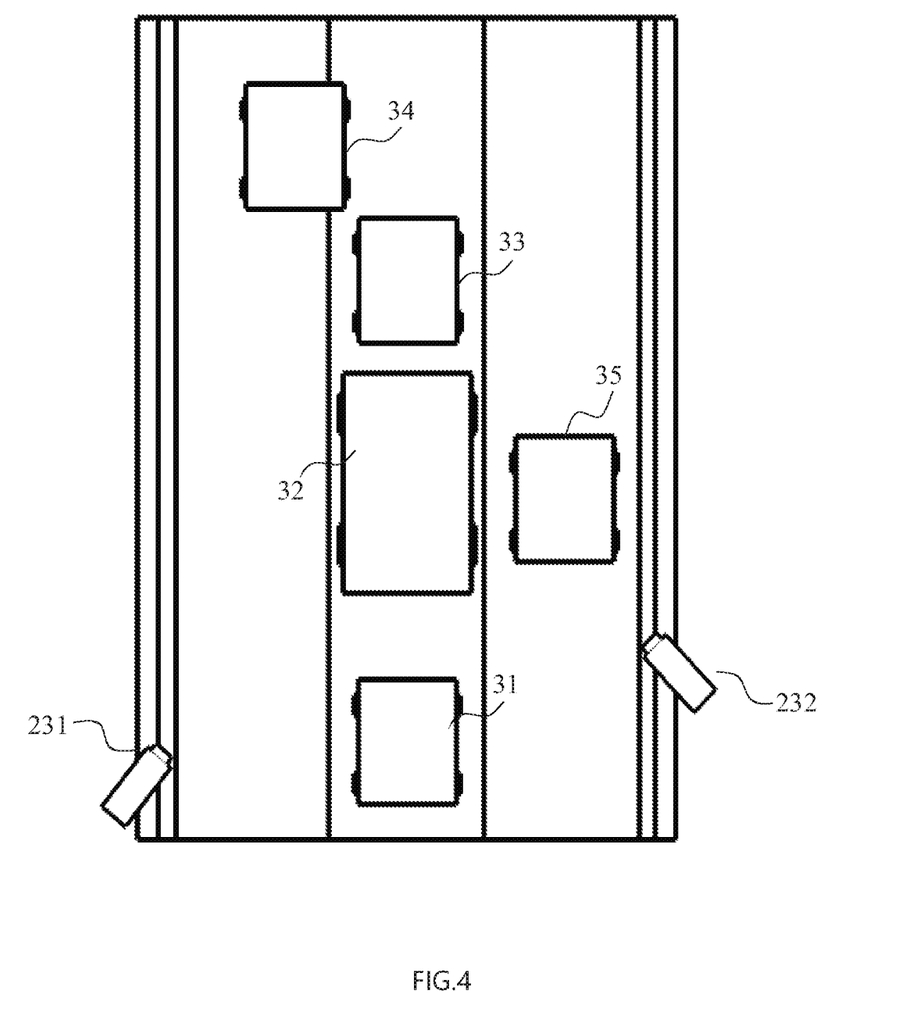
FIG. 4 shows a top view of the driving scenario for the first preferred embodiment according to the present invention.

Refer now conjunctively to FIGS. 3 and 4, wherein a side view and a top view of the system configuration for the first preferred embodiment according to the present invention are respectively shown, and the mobile vehicle 29 is exemplified in the Figures as the car 31, 33, 34, 35 and a larger car 32. The image capturing apparatus 23 includes an image capturing apparatus and a time stamp device and installed on a lamp post 36 along the two sides of the road 30 so as to obtain, for example, 360-degree view image capture; since the lamp post 36 is typically located near traffic lanes and positioned higher than vehicles 29, it has a better field of view and viewing angle for traffic monitoring and can see vehicle 33 without occlusion from vehicle 32.

In particular, because the lamp post 36 is of a fixed location, each image capturing apparatus has a fixed coordinate reference, and the image data obtained by two image capturing apparatuses can be used to accurately locate all moving objects on the road via triangulation method. Alternatively, using a fixed object such as building or lamp post, only a single image capturing apparatus is needed for relative positioning. For example, vehicle 33 is located at the central lane of the three-lane road so the exact position of this vehicle 33 can be obtained by means of interpolating calculation with respect to the road tree positions along the road in the opposite direction. Position accuracy of this method is highly dependent on the relative placement of objects. Position determination using fixed references is immune to relative shutter timing differences between image capturing apparatuses and can be used as a calibration reference for the system. Even in adverse weather conditions, 3-D radar on lamp post can still accurately return object shape and location, without the viewing angle problem with vehicle mounted 3-D radars. The ability to perform real time system calibration is a key attribute of the present invention.

Object position determination is highly influenced by the shutter timing differences amongst image capturing apparatuses. A vehicle traveling at 144 kilometers an hour will move 40 meters a second. Typical shutter time differences of $\frac{1}{60}$ of a second will result in position error of 0.67 meters, clearly not acceptable for traffic monitoring of high speed vehicles. Furthermore, captured images may arrive at the monitoring host processor via different routes, and the arrival time differences also add to the triangulation error of vehicle positions. In the preferred embodiment of this invention, two sets of cameras, 231, 232 mounted on lamp post 36 have time stamp on each and every image taken. Time stamp allows host processor to unravel timing differences and to perform position triangulation with very high precision. For example, if time stamp resolution is 1 mili-second, a vehicle traveling at 144 kilometers per hour will yield a position difference of only 4 centi-meters.

In the present preferred embodiment, each road section along the highway is installed with a set of monitoring hosts 21, which may comprise a processing device 211, a synchronization processor 213 and a database 215, in which the database 215 stores geographic information such as roads, bridges, surrounding fixtures, and surrounding houses or parks within the monitored area. Bridge out, flooding, debris on the road can be seen clearly with cameras mounted on lamp posts and when compared with static geographical information database 215, can issue warning to all road users.

Figure 5:
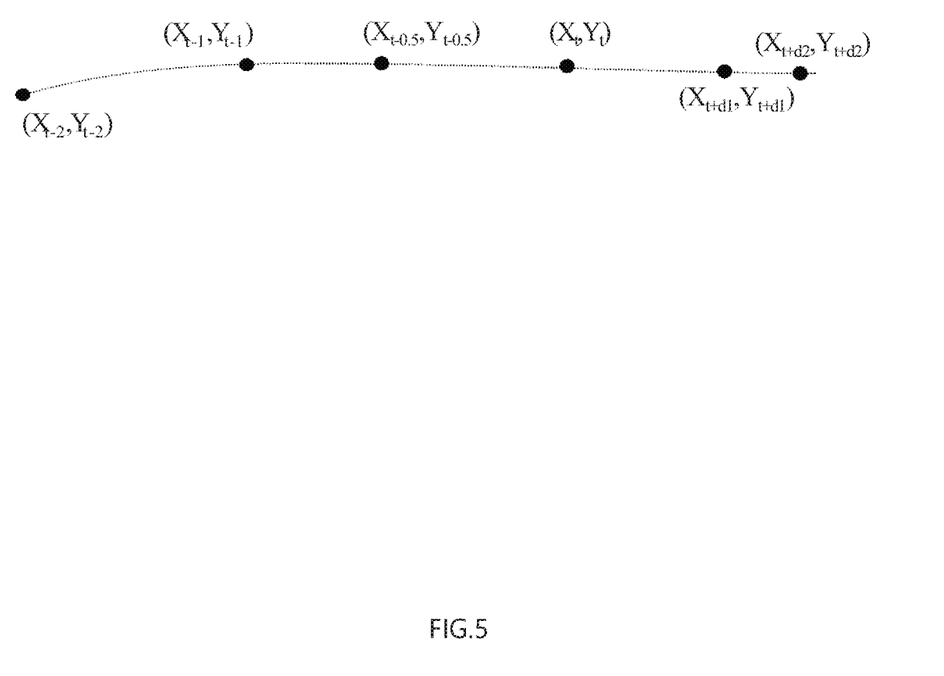
FIG. 5 shows a moving object trajectory and interpolation for past position and extrapolation for future, predicted position

Synchronization processor 213 in the monitoring host uses the time stamp to zero out image timing differences. FIG. 5 shows a moving object trajectory and interpolation for past position and extrapolation for future, predicted position. Location of a vehicle can be determined from the image data. For example, one can find the centroid of the vehicle roof, and to use it to construct the physical space occupied by the vehicle. The time stamps of the captured images from the image capturing apparatus 231 are marked at (t−2), (t−1) and t, wherein t is defined as the current time, while the time stamps of the captured images from the image capturing apparatus 232 are marked at (t−2.5), (t−1.5) and (t−0.5). Object location from camera 231 at (t−2.5), (t−1.5) and (t−0.5) can be interpolated from (t−2), (t−1) and t data via linear interpolation, spline interpolation or, in some cases, polynomial interpolation. Let us define location of the same vehicle on imaging capturing apparatus 231 at corresponding time stamp as $(X_{t-2}, Y_{t-2})$, $(X_{t-1}, Y_{t-1})$, $(X_t, Y_t)$ then, by using the vehicle trajectory interpolation, it is possible to figure out the vehicle location of the car at the time point (t−0.5) is $(X_{t-0.5}, Y_{t-0.5})$. The calculated position is now in synchronization with the time stamp of imaging capturing apparatus 232, all timing differences eliminated, and the triangulation will yield vehicle position with high precision. Furthermore, travel distance from (t−2) to (t−1) is less than (t−1) to t, so we can deduct that the vehicle is accelerating, and the position interpolation between captured images can be made more accurately than linear interpolation.

It should be noted that the information stored in each of the geographical information database 215 may include fixed geographic information, vehicle crossing border information, moving object location and trajectory information, alarm information and ancillary information. Herein the fixed geographic information may include roads, buildings, trees, rivers, street lamps, traffic lights, bridges and construction items, and snow, floods, broken bridges, fallen trees, earth and stone, car accidents, and road repairs after disasters can be also categorized as the fixed geographic information; the vehicle crossing border information may include, for example, parking lots, roadside railings, intersections, highway exits, level crossings and toll gates; the moving object geographic information may provide location and trajectory prediction information, collision warning amongst moving objects; and the ancillary information may include vehicle models, license plates, speed, acceleration, unusual trajectory due to driver under the influence, road features, and weather/climate information. Hence, the processing device 211 can analyze the time variant object information in accordance with the aforementioned information, and then transmit all information to the data capture device 27.

With the vehicle trajectory interpolation method, it is also possible to extrapolate the positions of the car in the future. For example, at (t+d1), (t+d2) the position will be $(X_{t+d1}, Y_{t+d1})$, $(X_{t+d2}, Y_{t+d2})$. Since the vehicle may accelerate, decelerate or turn, future location prediction is cataloged into different zones: A small zone for normal vehicle operation, a larger zone representing alert situation when the driver has taken out of the ordinary moves, and an even large zone presenting that the vehicle is out of control and will result in roll over or collision. Assembling of all moving objects in predictive zones allows the system to issue alert or warning messages to all road users in the vicinity, greatly improve traffic safety.

In the present preferred embodiment, all vehicles 29 are configured with the data capture device 27 which includes a wireless communication unit 271, a timing unit 272, a memory module 273 and a traffic scenario output interface 274. When transfer information to the monitoring host 21, time stamp is enclosed with each information packet. The receiving end will decode the time stamp and compare with host time to determine transmission delay of that information packet. The monitoring host can then send a predicted trajectory map of surrounding moving objects to the vehicle, dialing in the transmission delay, so the trajectory map information will arrive at the vehicle in synchronization with the present position and time of the vehicle. The ability to synchronize time variant geographical information system to the present time and position of the vehicle is very beneficial to the operational safety of the vehicle with human driver, as well as autonomous vehicles. The ability to synchronize geographical information collected from different sensors with different path delays allows for collaborative collection of time variant geographical information from sensors in the road side units as well as vehicles. It also provides an operational redundancy and reliability immune to individual sensor failures in the vehicle or the road side unit.

If static geographical information database is up to date on vehicle 29, and stored in memory unit 273, then monitoring host 21 only have to send moving object information, and data capture device 27 can still compute the final road condition information and sent out via output interface 274.

Since the image capturing apparatus 23 is disposed under the lamp post with good field of view, it allows the monitoring host 21 to do excellent object recognition and tracking of all moving objects. As shown in FIG. 4, vehicle 31 is obstructed by a large vehicle 32 in front, with vehicle 33 and 34 not visible from its vehicle mount sensors. When vehicle 34 suddenly stopped, a chain reaction of following vehicles were not known to vehicle 31 until vehicle 32 also made its safety maneuvers and the location of vehicle 33 and 34 are visible. By then there is very little time for vehicle 31 to react and accident may not be avoided. This is the reason why keeping a safe distance with the vehicle in front is a good defensive driving code. This is also a key reason limiting the highest speed an autonomous vehicle may travel.

Figure 6:
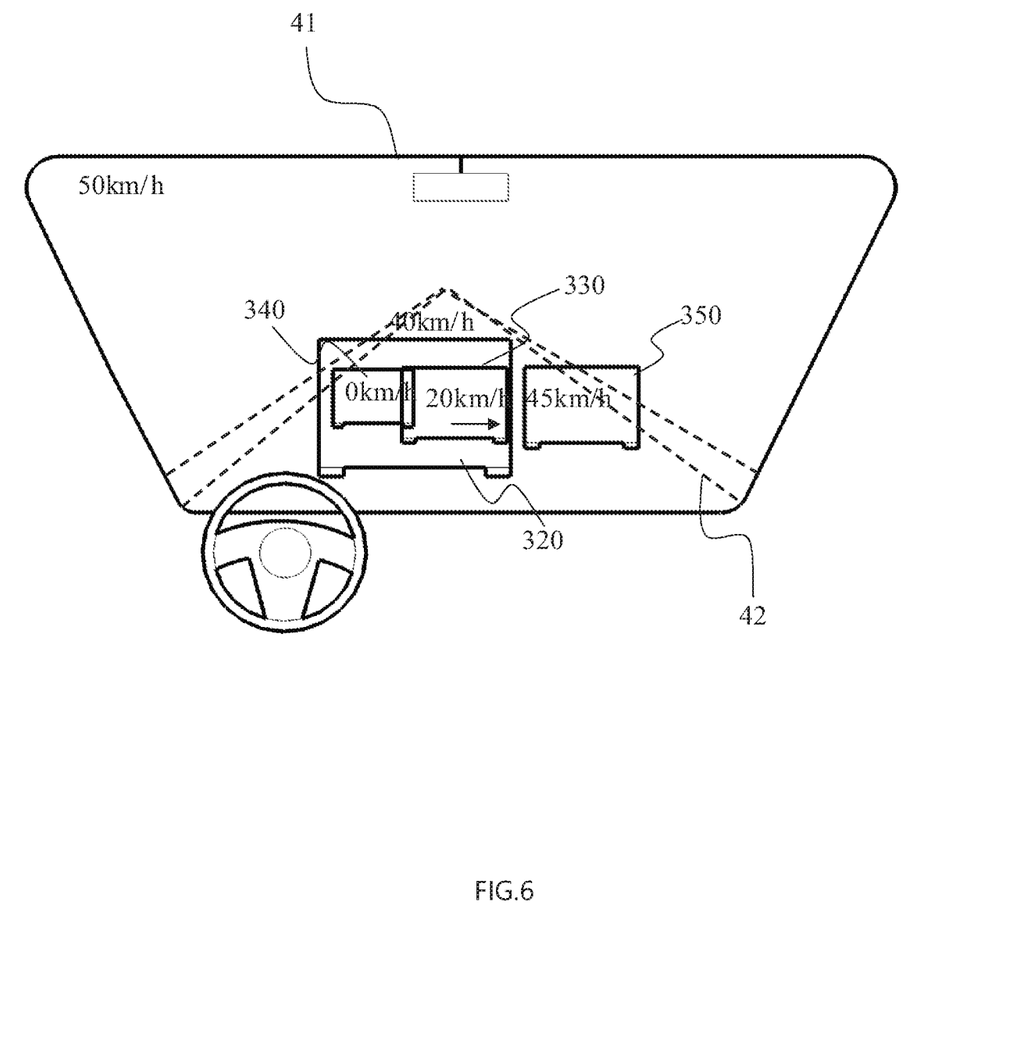
FIG. 6 shows a display of the traffic scenario output interface for the first preferred embodiment according to the present invention.

In accordance with the operations of the time variant geographical information system in the present invention, the monitoring host 21 acting as a local traffic information hub can provide the time variant object information such as the positions and speeds of the vehicles 34 and 33 to the data capture device 27 of the vehicle 31, and then the controller in the data capture device 27 can construct a forward looking view and send to the heads-up display, showing the location and speed of vehicles 33 and 34 blocked by the vehicle 32 in front. As shown in FIG. 6, the road condition ahead is projected on the windshield 41 in front of the driver, and, in addition to the actual vehicle 35 and the front large vehicle 32 that the driver himself/herself can see, the virtual vehicle icon 320 of the large vehicle 32, the virtual vehicle icon 330 of the obscured vehicle 33 as well as the virtual vehicle icon 340 of the vehicle 34 are also shown on the screen. In the present embodiment, the driving speed indicator corresponding to the vehicle is displayed above each virtual vehicle icon, and if the predicted driving route of the vehicle changes, the indicating direction is also further displayed on the screen. Moreover, the traffic scenario output interface in the present embodiment further includes a warning device thereby providing, for example, a buzzer alert when a dangerous scenario is developing.

In this way, the driver of the vehicle 31 can clearly know that vehicle 34 is stationary, and will not choose to change the lane to the left, but alternatively choose to decelerate or change to the right lane. As such, unnecessary irritability or chasing accidents can be successfully avoided, the safety and comfort of the driver can be effectively improved, and the driver's operation becomes less stressful. In addition, the indication route 42 is the geographic information of the roads adjacent to the vehicle 31, and if the direction of the road in the driving direction changes, the direction of the indication route 42 on the screen also correspondingly changes. For example, if the road ahead is towards the direction of a left turn, then the indication route 42 will bend towards the left side thereby reminding the driver to prepare for a left turn. Certainly, those skilled in the art can implement different displays such as augmented display, separate display for this application. The present invention can also improve the operational safety of autonomous vehicles since its on board sensors are also occulated by the vehicle in front.

Second Preferred Embodiment

Figure 7:
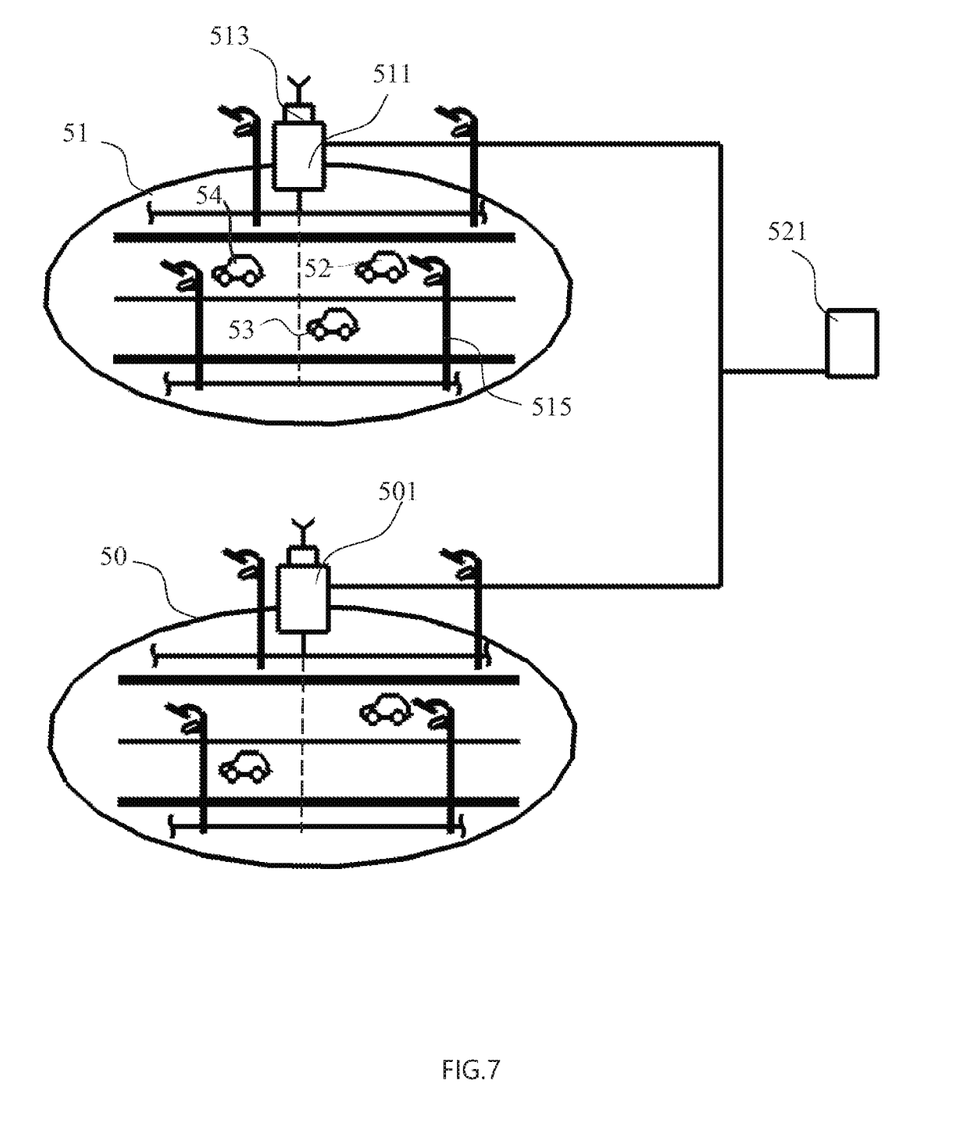
FIG. 7 shows a system diagram of a second preferred embodiment for the time variant geographical information system according to the present invention.

FIG. 7 shows a second preferred embodiment for the time variant geographical information system according to the present invention, Only the differences with previous embodiment will be disclosed for brevity sake.

The time variant geographical information system in the present embodiment is applied to traffic management, which integrates the functions of traffic information communication, traffic signaling system, traffic violation warning and detection. In zone 51 there is a monitoring host 511, a communication device 513 and four image capturing apparatus 515; there are three vehicles 52, 53 and 54. Other devices on monitoring host 501 are configured similar to the counterparts in zone 51, in which the monitoring host 511 and the monitoring host 501 are respectively connected to the monitoring host 521 as a network. As vehicles 52, 53, 54 crossing over to the area covered by monitoring host 501, the network allows for seamless transition to monitoring host 501 for wirelessly contacting the data capture devices for timing integration and time variant object information output.

Figure 8:
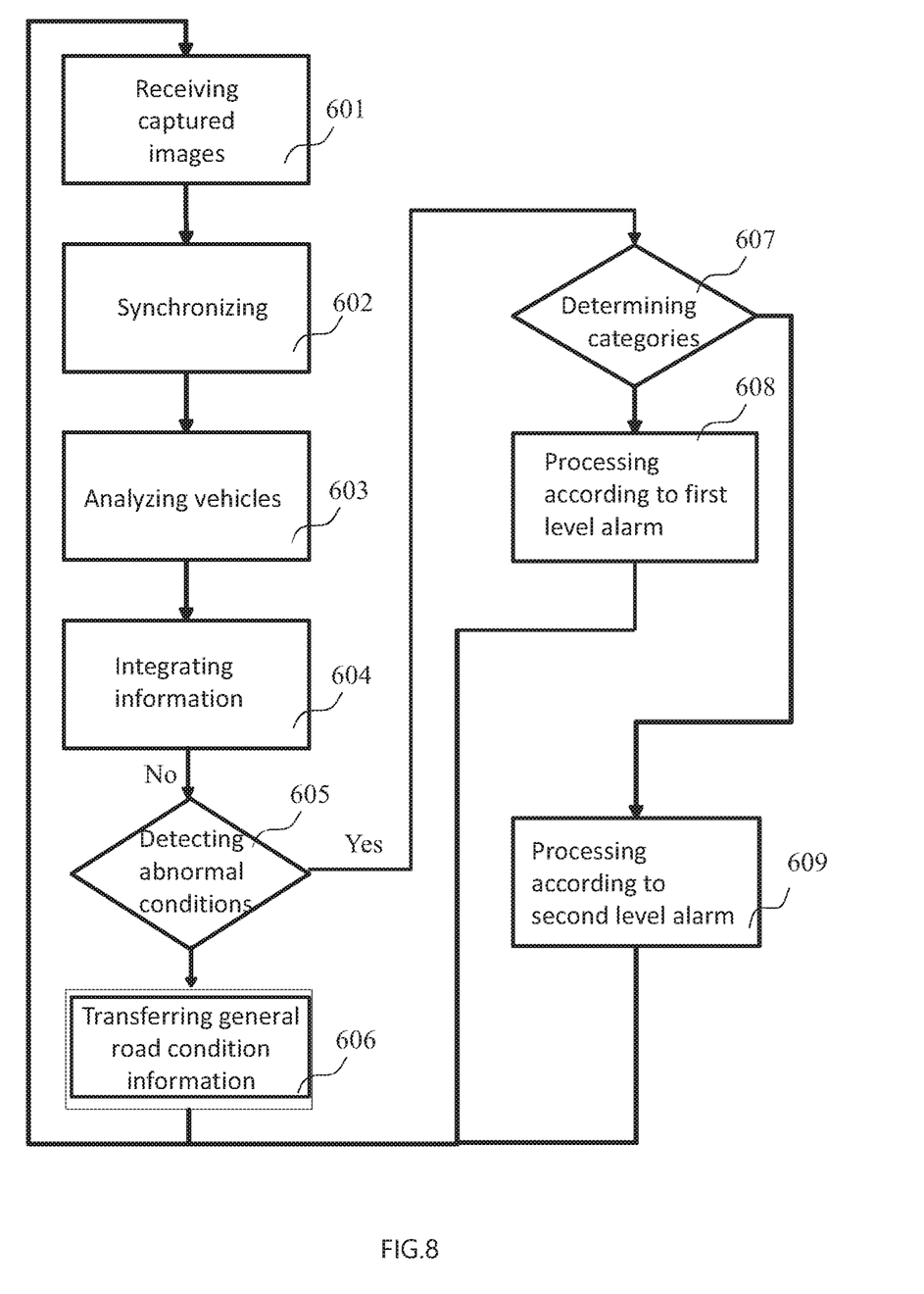
FIG. 8 shows a system flowchart concerning the traffic information communication of the second preferred embodiment according to the present invention.

A transport information communication system flowchart of the present embodiment is shown in FIG. 8. At Step 601, the monitoring host 511 receives the image data captured by each of the image capturing apparatus 515. In step 602, Synchronization processor in the monitoring host uses the time stamp to zero out image timing differences of two image files to be used for position determination. In step 603, triangulation method is used to determine the accurate positions of all moving objects. In step 604, all moving object information is consolidated and trajectory prediction is computed. In step 605, out of the ordinary movement of vehicles are marked and alert issued to surrounding vehicles; predicted vehicle trajectory crossover, signaling a potential collision event is highlighted and warning messages are send to involved vehicles. In step 607, hazard level is evaluated and different severity warning messages are issued in step 608 or step 609. In step 606, the up to date moving object location is broadcasted to all road users. Depending on the scope and type of hazard, step 609 may broaden the area of broadcast to a wide area. Examples would be multiple vehicle collisions or bridge out or flooding. Furthermore, emergency vehicles or hospitals may be alerted even before the hazard event is played out. In this preferred embodiment of a time variant geographical information system, the transport information communication system takes on an active role and can alert road users, signaling systems and authority with very short time delay and significantly improve road safety. In addition, a preferred embodiment of a time variant geographical information system can segment road boundaries into different levels based on the severity of hazard when crossed inadvertently. For an edge of cliff or bridge, border infringement is deadly. For a cross section with traffic signaling red, border infringement can result in collisions and the driver should be ticketed. For an entrance to a building, border crossing to make U turns are quiet safe.

Figure 9:
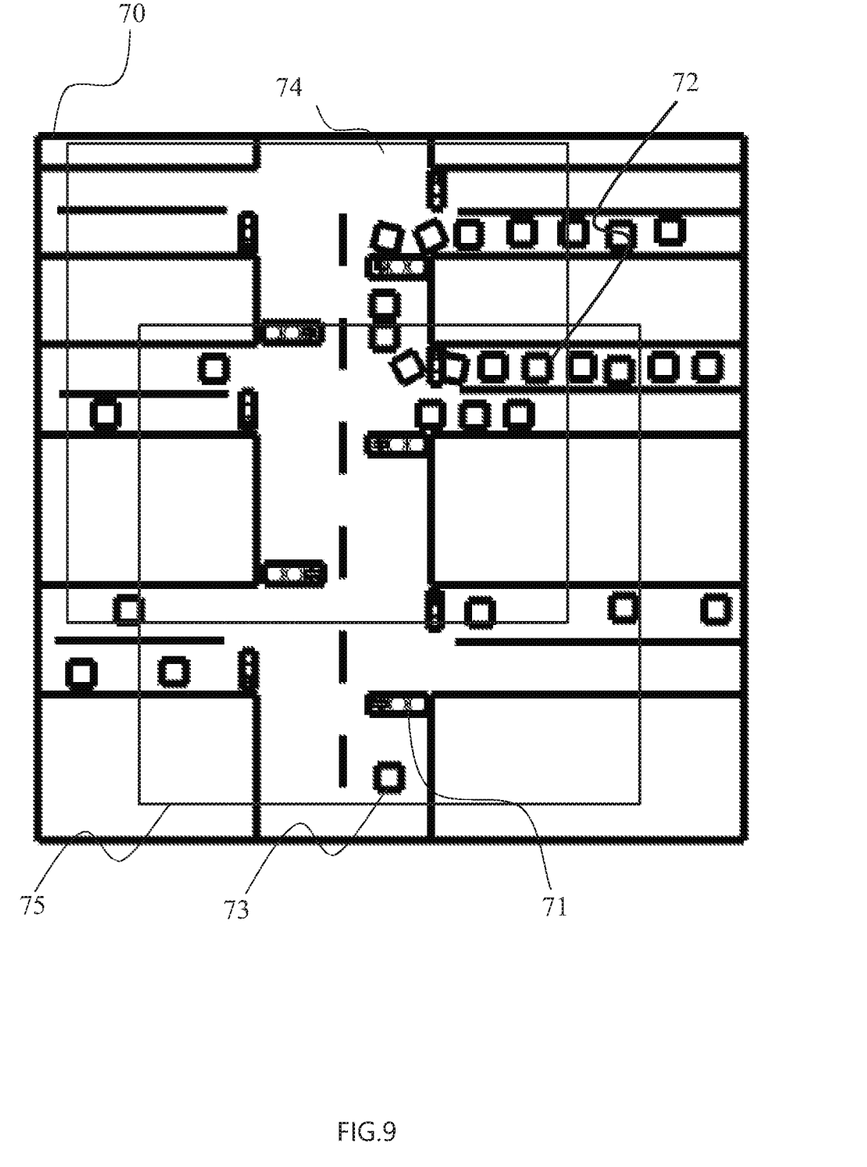
FIG. 9 shows an aerial view of traffic conditions from several road blocks assembled from a preferred embodiment of a time variant geographical information system.

FIG. 9 shows an aerial view of traffic conditions from several road blocks assembled from a preferred embodiment of a time variant geographical information system. The aerial view can be transmitted in streamed video format to all road users without additional hardware/software installation in the car. Video streaming to all vehicles also minimizes host computer processing time and data transmission bandwidth to each individual vehicle. Furthermore, the aerial image can be zoomed in/out by road users, allowing all road users a clear view of the traffic conditions. The same serial view can also be transmitted to a regional intelligent transport system (ITS) control center.

Figure 10:
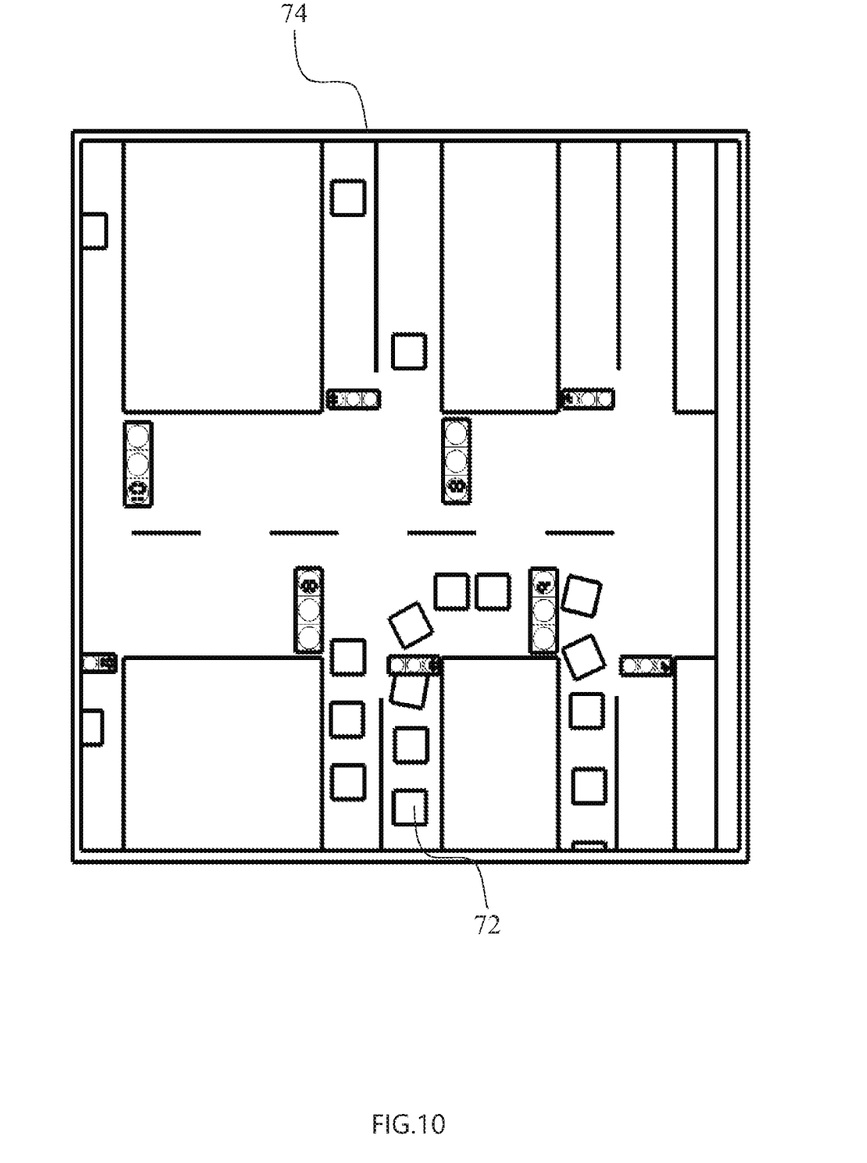
FIG. 10 shows a display of the traffic scenario output for a car illustrated in FIG. 9.
Figure 11:
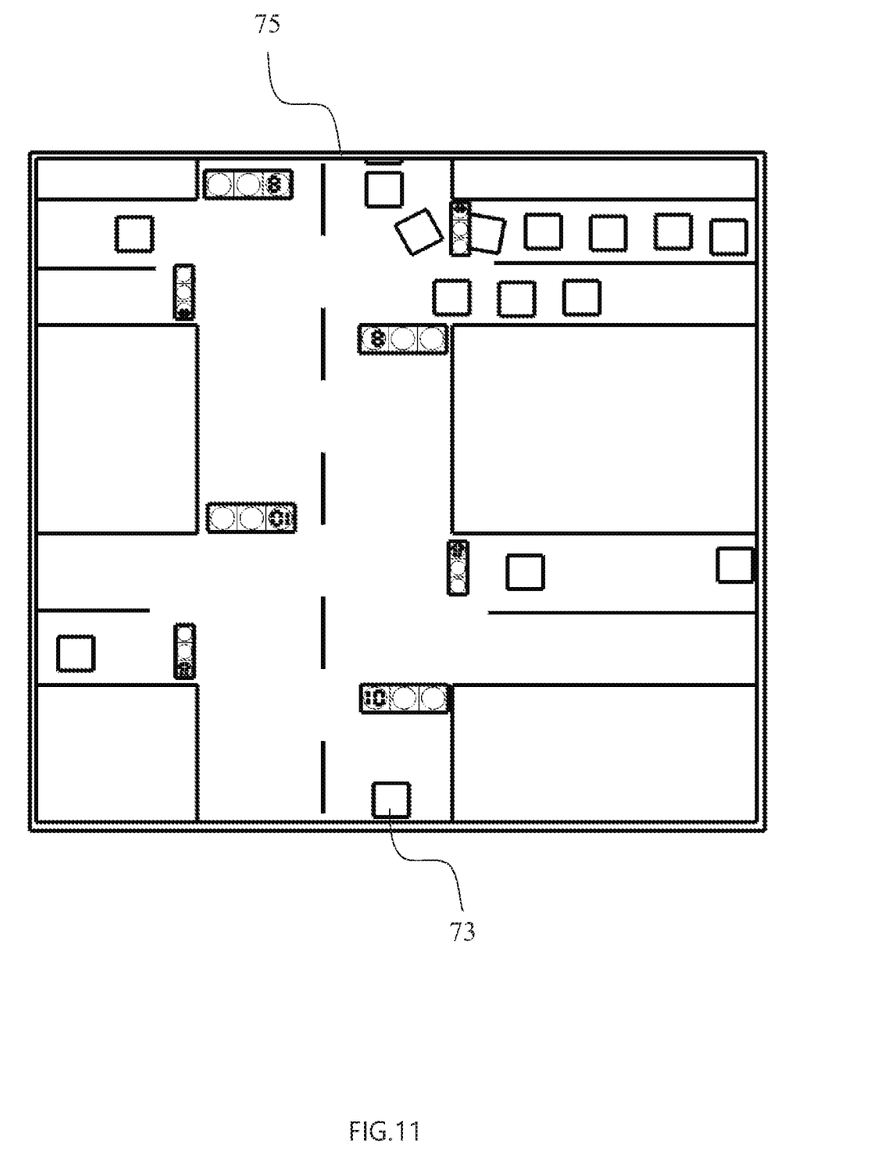
FIG. 11 shows a display of the traffic scenario output for another car illustrated in FIG. 9.

FIG. 10 shows an aerial view of traffic conditions from several road blocks assembled from a preferred embodiment of a time variant geographical information system and via the synchronization routine, transmit data to match the current time of vehicle 72, to show the queue going into a parking lot. Similarly, FIG. 11 shows a custom tailored view for vehicle 73, enable the driver to plan the route more efficiently.

In summary, the time variant geographical information system data acquisition device for mobile vehicles and the system according to the present invention can extrapolate all moving object trajectories in an area to a fixed time for all vehicles, or to each target vehicle, eliminating position errors resulting from camera shutter time delay, transmission delays, and data processing delays. Due to the field of view advantage of higher than vehicle position, data acquisition device offers better resolution for the monitoring of changes in physical structures such as bridge out, road break, or flooding. The same field of view advantage eliminates scene occlusion from other vehicles or buildings or other roadways. When compared with vehicle mount image capturing apparatus, fixed location cameras are significantly better in static or moving object recognition, and identification, with much higher robustness, and using much less computing power. The image capturing apparatus of present invention have time stamp on each image. It allows for a remote processor, via interpolation, to synchronize with other cameras for object triangulation. In addition, with trajectory extrapolation, locations of moving objects can be projected forward in time, and be synchronized with the present time of a target vehicle, to support the driver or an autonomous system in better understanding of the driving scenario. Furthermore, by tracking vehicles crossing into pre-defined borders, traffic infraction, parking management, and other intelligent transport system capabilities can be developed.

What is claimed is:

1. A time variant geographical information system, which provides time variant geographical information to at least one mobile vehicle, wherein the system comprises:
   a plurality of image capturing apparatuses, in which at least part of the image capturing apparatuses are installed at locations higher than the mobile vehicle, each of the image capturing apparatuses aiming at a different road segment and having a capability to output information with precise time stamp;
   at least one monitoring host for receiving image data having the time stamp, the monitoring host including: a synchronization processor, a processing device and a database, wherein the synchronization processor operates on at least part of the image data, such that all of the time stamps have a same time axis reference point as a basis for differentiating a synchronization error from a transfer rate discrepancy; and the database stores the geographic information of all fixed objects in the road segment in at least part of a three-dimensional space, and the database also stores the time variant location information of a moving object;
   at least one time variant geographical information acquisition system installed on the vehicle, wherein the acquisition system includes: a wireless communication unit for connecting to the image capturing apparatus and/or the monitoring host; a timing unit used for operating conjunctively with the wireless communication unit to output a timing signal; a memory module storing the geographic information corresponding to at least the moving objects in the three-dimensional space; and a traffic scenario output interface for jointly displaying the geographic information and moving object information;
   wherein the processing device from the monitoring host, based on the time difference between the timing signal received from the timing unit and the time stamp, generates a new, time base corrected, predicted moving object location for the time variant geographical information acquisition system and transmits to the vehicle, such that when the vehicle drives into the road segment, the processing device determines relative position of the vehicle with respect to all of the fixed objects based on the image data with the time stamp.

2. The time variant geographical information system according to claim 1, wherein the image capturing apparatus is located at a street lamp post or a post supporting traffic signaling equipment, a pedestrian footbridge, or a corner of a building.

3. The time variant geographical information system according to claim 1, wherein the traffic scenario output interface further includes a warning device that sends a warning signal when the processing device determines that the time variant geographical information exceeds a prescribed limit.

4. The time variant geographical information system according to claim 1, wherein the traffic scenario output interface is a video based display.

5. The time variant geographical information system according to claim 4, wherein the video based display is an augmented reality head-up display.

6. The time variant geographical information system according to claim 1, further comprising: a communication device used for connecting the image capturing apparatuses and/or the monitoring host to the wireless communication unit.

7. A vehicle based time variant geographical information acquisition system capable of receiving time variant geographical information from at least one remote monitoring host and providing the time variant geographical information to a vehicle driver or autonomous driving system, at least part of a plurality of image capturing apparatuses being installed at locations higher than the vehicle, each of the image capturing apparatuses aiming at a different road segment and having a capability to output information with precise time stamp, the at least one monitoring host receiving image data having the time stamp, the monitoring host including: a synchronization processor, a processing device and a database, wherein the synchronization processor operates on at least part of the image data, such that all of the time stamps have a same time axis reference point as a basis for differentiating a synchronization error from a transfer rate discrepancy, and the database stores the geographic information of all fixed objects in the road segment in at least part of a three-dimensional space, and the database also stores time variant location information of moving objects; such that when the vehicle drives into the road segment, the processing device determines relative position of the vehicle with respect to all of the fixed objects based on the image data with the time stamp, wherein the acquisition system includes:
   a wireless communication unit for connecting the image capturing apparatuses and/or the monitoring host;
   a timing unit used for operating conjunctively with the wireless communication unit to output a timing signal;
   a memory module storing the geographic information corresponding to at least the moving objects in the three-dimensional space; and
   a traffic scenario output interface for jointly displaying the geographic information and moving object information, wherein the processing device from the monitoring host, based on time difference between the timing signal received from the timing unit and the time stamp, generates a new, time base corrected, predicted moving object location for the time variant geographical information acquisition system and transmits to the vehicle.

8. The vehicle based time variant geographical information acquisition system according to claim 7, wherein the traffic scenario output interface further includes a warning device that sends a warning signal when the processing device determines that the time variant geographical information generates a change exceeding a prescribed range.

9. The vehicle based time variant geographical information acquisition system according to claim 7, wherein the traffic scenario output interface is a video based display.

10. The vehicle based time variant geographical information acquisition system according to claim 9, wherein the video based display is an augmented reality head-up display.

11. The vehicle based time variant geographical information acquisition system according to claim 7, further comprising: a communication device used for connecting the image capturing apparatuses and/or the monitoring host to the wireless communication unit.

* * * * *